US011432111B2

(12) United States Patent
Nakagawa et al.

(10) Patent No.: US 11,432,111 B2
(45) Date of Patent: Aug. 30, 2022

(54) INFORMATION PROCESSING DEVICE

(71) Applicant: NTT DOCOMO, INC., Chiyoda-ku (JP)

(72) Inventors: Tomohiro Nakagawa, Chiyoda-ku (JP); Atsushi Wada, Chiyoda-ku (JP); Shoichi Horiguchi, Chiyoda-ku (JP); Junkou Katou, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 151 days.

(21) Appl. No.: 17/053,576

(22) PCT Filed: Mar. 26, 2019

(86) PCT No.: PCT/JP2019/012957
§ 371 (c)(1),
(2) Date: Nov. 6, 2020

(87) PCT Pub. No.: WO2019/216046
PCT Pub. Date: Nov. 14, 2019

(65) Prior Publication Data
US 2021/0235226 A1 Jul. 29, 2021

(30) Foreign Application Priority Data
May 10, 2018 (JP) .............................. JP2018-091253

(51) Int. Cl.
*H04W 64/00* (2009.01)
*H04W 4/029* (2018.01)
*G01S 5/02* (2010.01)

(52) U.S. Cl.
CPC ........... *H04W 4/029* (2018.02); *G01S 5/0249* (2020.05)

(58) Field of Classification Search
None
See application file for complete search history.

(56) References Cited

U.S. PATENT DOCUMENTS 9,572,125 B1* 2/2017 Wang ................. H04W 12/64
11,134,461 B2* 9/2021 Vyunova ............... G01S 5/012
(Continued)

FOREIGN PATENT DOCUMENTS

JP        10-94040 A        4/1998
JP      2012-257245 A      12/2012
(Continued)

OTHER PUBLICATIONS

International Search Report dated Jun. 25, 2019 in PCT/JP2019/012957 filed on Mar. 26, 2019, citing documents AP-AR therein, 2 pages.

*Primary Examiner* — Dai Phuong
(74) *Attorney, Agent, or Firm* — Oblon, McClelland, Maier & Neustadt, L.L.P.

(57) ABSTRACT

A server performs: acquiring measurement data of a mobile terminal; extracting fixed AP measurement data of a specific fixed AP; extracting measurement data including a measurement time of which a difference from the measurement time in the fixed AP measurement data is equal to or less than a threshold value, position information of which a difference from a position of the specific fixed AP is equal to or less than a threshold value, and a reception intensity of which a difference from the reception intensity in the fixed AP measurement data is equal to or less than a threshold value as target measurement data and to set the radio access point corresponding to the target measurement data as a target AP; and determining whether the target AP corresponds to a fixed AP on the basis of the measurement data corresponding to the target AP and the fixed AP measurement data.

6 Claims, 8 Drawing Sheets

(56) References Cited

U.S. PATENT DOCUMENTS

| | | | | |
|---|---|---|---|---|
| 2004/0162084 A1* | 8/2004 | Wang | ............... | G01S 19/28 |
| | | | | 455/457 |
| 2011/0316695 A1* | 12/2011 | Li | ..................... | G01S 5/02 |
| | | | | 340/539.13 |
| 2013/0116966 A1* | 5/2013 | D'Jesus Bencci | ...... | G06F 15/00 |
| | | | | 702/150 |
| 2014/0211691 A1* | 7/2014 | Emadzadeh | ......... | G01S 5/0242 |
| | | | | 370/328 |
| 2022/0046521 A1* | 2/2022 | Ghessassi | ............ | H04W 76/15 |

FOREIGN PATENT DOCUMENTS

| | | |
|---|---|---|
| JP | 2016-116141 A | 6/2016 |
| JP | 2017-520975 A | 7/2017 |

\* cited by examiner

Fig.2

| MEASUREMENT TIME | LATITUDE | LONGITUDE | SSID | BSSID | RECEPTION INTENSITY (dBm) | ... |
|---|---|---|---|---|---|---|
| 09/19 01:41:01 | 35.609897 | 139.742252 | SSID-1 | aa:aa:aa:aa:aa:01 | -56 | ... |
| 09/19 01:41:01 | 35.609897 | 139.742252 | SSID-2 | xx:xx:xx:xx:xx:02 | -60 | ... |
| 09/19 01:41:01 | 35.609897 | 139.742252 | SSID-3 | xx:xx:xx:xx:xx:03 | -70 | ... |
| ... | ... | ... | ... | ... | ... | ... |

Fig.3

| SSID | BSSID | INSTALLATION POSITION INFORMATION | | | ... |
| | | LATITUDE | LONGITUDE | POI NAME | |
| SSID-1 | aa:aa:aa:aa:aa:01 | 35.609897 | 139.742252 | STORE A | ... |
| | bb:bb:bb:bb:bb:02 | 35.212341 | 138.942334 | STORE B | ... |
| | cc:cc:cc:cc:cc:03 | 35.438599 | 139.437289 | STORE C | ... |
| ... | ... | ... | ... | ... | ... |

Fig.4

|    | SUN  | MON  | TUE  | WED  | THU   | FRI   | SAT   |
|----|------|------|------|------|-------|-------|-------|
| 0  | 2    | 2    | 2    | 4    | 6     | 11    | 18    |
| 1  | 4    | 3    | 2    | 6    | 8     | 15    | 25    |
| 2  | 3    | 2    | 2    | 4    | 6     | 11    | 18    |
| 3  | 5    | 4    | 3    | 8    | 12    | 22    | 36    |
| 4  | 6    | 5    | 4    | 10   | 15    | 27    | 45    |
| 5  | 3    | 2    | 2    | 4    | 6     | 11    | 18    |
| 6  | 3    | 2    | 2    | 4    | 6     | 11    | 18    |
| 7  | 423  | 338  | 270  | 676  | 1000  | 1811  | 3011  |
| 8  | 345  | 276  | 221  | 552  | 817   | 1479  | 2459  |
| 9  | 432  | 346  | 277  | 692  | 1024  | 1854  | 3083  |
| 10 | 43   | 34   | 27   | 68   | 100   | 182   | 302   |
| 11 | 432  | 346  | 277  | 692  | 1024  | 1854  | 3083  |
| 12 | 4235 | 3388 | 2710 | 6776 | 10028 | 18159 | 30193 |
| 13 | 5324 | 4259 | 3407 | 8518 | 12606 | 22828 | 37955 |
| 14 | 43   | 34   | 27   | 68   | 100   | 182   | 302   |
| 15 | 43   | 34   | 27   | 68   | 100   | 182   | 302   |
| 16 | 3    | 2    | 2    | 4    | 6     | 11    | 18    |
| 17 | 4    | 3    | 2    | 6    | 8     | 15    | 25    |
| 18 | 3    | 2    | 2    | 4    | 6     | 11    | 18    |
| 19 | 43   | 34   | 27   | 68   | 100   | 182   | 302   |
| 20 | 43   | 34   | 27   | 68   | 100   | 182   | 302   |
| 21 | 4    | 3    | 2    | 6    | 8     | 15    | 25    |
| 22 | 23   | 18   | 14   | 36   | 53    | 96    | 160   |
| 23 | 3    | 2    | 2    | 4    | 6     | 11    | 18    |

*Fig.5*

|    | SUN  | MON  | TUE  | WED  | THU   | FRI   | SAT   |
|----|------|------|------|------|-------|-------|-------|
| 0  | 5    | 4    | 3    | 8    | 12    | 22    | 36    |
| 1  | 3    | 2    | 2    | 4    | 6     | 11    | 18    |
| 2  | 4    | 3    | 2    | 6    | 8     | 15    | 25    |
| 3  | 5    | 4    | 3    | 8    | 12    | 22    | 36    |
| 4  | 6    | 5    | 4    | 10   | 15    | 27    | 45    |
| 5  | 3    | 2    | 2    | 4    | 6     | 11    | 18    |
| 6  | 3    | 2    | 2    | 4    | 6     | 11    | 18    |
| 7  | 23   | 18   | 14   | 36   | 53    | 96    | 160   |
| 8  | 43   | 34   | 27   | 68   | 100   | 182   | 302   |
| 9  | 32   | 26   | 21   | 52   | 77    | 139   | 231   |
| 10 | 43   | 34   | 27   | 68   | 100   | 182   | 302   |
| 11 | 43   | 34   | 27   | 68   | 100   | 182   | 302   |
| 12 | 32   | 26   | 21   | 52   | 77    | 139   | 231   |
| 13 | 42   | 34   | 27   | 68   | 100   | 182   | 302   |
| 14 | 43   | 34   | 27   | 68   | 100   | 182   | 302   |
| 15 | 342  | 274  | 219  | 548  | 811   | 1469  | 2442  |
| 16 | 3    | 2    | 2    | 4    | 6     | 11    | 18    |
| 17 | 42   | 34   | 27   | 68   | 100   | 182   | 302   |
| 18 | 42   | 34   | 27   | 68   | 100   | 182   | 302   |
| 19 | 4242 | 3394 | 2715 | 6788 | 10046 | 18192 | 30247 |
| 20 | 42   | 34   | 27   | 68   | 100   | 182   | 302   |
| 21 | 42   | 34   | 27   | 68   | 100   | 182   | 302   |
| 22 | 42   | 34   | 27   | 68   | 100   | 182   | 302   |
| 23 | 3    | 2    | 2    | 4    | 6     | 11    | 18    |

INFORMATION PROCESSING DEVICE

TECHNICAL FIELD

An aspect of the present invention relates to an information processing device.

BACKGROUND ART

In the related art, a technique of estimating a position of a mobile terminal on the basis of radio waves which are received from a radio access point by the mobile terminal is known (for example, see Patent Document 1). Patent Document 1 discloses that a mobile terminal detects a plurality of radio access gateways (radio access points), receives position data of the detected radio access gateways from a server, and estimates a position of the mobile terminal on the basis of the received position data.

CITATION LIST

Patent Document

[Patent Document 1] Japanese Unexamined Patent Publication No. 2012-257245

SUMMARY OF INVENTION

Technical Problem

In the technique disclosed in Patent Document 1, for example, when information of a movable radio access point (hereinafter referred to as a "movable AP") such as a mobile Wi-Fi router is used, there may be an error between an actual position of the movable AP and a position indicated by the position data of the movable AP received from the server. As a technique of estimating a position of a mobile terminal on the basis of radio waves from a radio access point, it is conceivable that a model receiving an input of a reception intensity of radio waves (for example, a received signal strength which is expressed in units of RSSI, dBm, and the like) from one or more radio access points which have been received by the mobile terminal and outputting a position of the mobile terminal (for example, position coordinates or information (store information or the like) indicating a staying place) be used. At the time of generating such a model by machine learning, learning data associated with the reception intensity of radio waves from a movable AP can serve as noise and be a cause of decrease in accuracy of the model. Specifically, since a position of a movable AP may differ at the time of generating a model and at the time of using the model, it is preferable that data associated with the reception intensity of radio waves from the movable AP be excluded from learning data for the model and input data at the time of using the model.

An objective of an aspect of the invention is to provide an information processing device that can appropriately extract a radio access point which is effective for estimating a position of a mobile terminal.

Solution to Problem

According to an aspect of the present invention, there is provided an information processing device including: an acquisition unit configured to acquire one or more pieces of measurement data including identification information for identifying a radio access point from which radio waves have been received by a mobile terminal, a reception intensity of the radio waves in the mobile terminal, a measurement time corresponding to a time at which the radio waves have been received by the mobile terminal, and position information indicating a position of the mobile terminal corresponding to the measurement time from one or more mobile terminals; an extraction unit configured to extract the measurement data including the identification information of a specific fixed AP as fixed AP measurement data with reference to a storage unit in which the identification information of one or more fixed APs which are radio access points of which an installation position is fixed and installation position information indicating the installation position are stored; a setting unit configured to extract the measurement data including the measurement time of which a difference from the measurement time included in the fixed AP measurement data is equal to or less than a predetermined threshold value, the position information of which a difference from the installation position of the specific fixed AP is equal to or less than a predetermined threshold value, and the reception intensity of which a difference from the reception intensity included in the fixed AP measurement data is equal to or less than a predetermined threshold value as target measurement data and to set the radio access point corresponding to the identification information included in the target measurement data as a target AP; and a determination unit configured to determine whether the target AP is a radio access point which is fixed at a predetermined installation position on the basis of the measurement data including the identification information corresponding to the target AP and the fixed AP measurement data.

In the information processing device according to the aspect of the invention, measurement data including a measurement time of which a difference from the measurement time included in the fixed AP measurement data is equal to or less than a predetermined threshold value, position information of which a difference from the installation position of the specific fixed AP is equal to or less than a predetermined threshold value, and a reception intensity of which a difference from the reception intensity included in the fixed AP measurement data is equal to or less than a predetermined threshold value is extracted as target measurement data. The radio access point corresponding to the identification information included in the target measurement data is set as a target AP. With this process, it is possible to appropriately extract a radio access point which may be fixed to a position close to the installation position of a specific fixed AP. With the information processing device, whether the target AP is a radio access point fixed to a predetermined installation position (that is, a radio access point which is useful for estimating the position of a mobile terminal) is determined on the basis of the measurement data including the identification information corresponding to the target AP and the fixed AP measurement data. As a result, it is possible to appropriately extract a radio access point which is useful for estimating a position of a mobile terminal.

Advantageous Effects of Invention

According to an aspect of the present invention, it is possible to provide an information processing device that can appropriately extract a radio access point which is effective for estimating a position of a mobile terminal.

BRIEF DESCRIPTION OF DRAWINGS

FIG. 2 is a diagram illustrating an example of measurement data.

FIG. 3 is a diagram illustrating an example of fixed AP information.

FIG. 4 is a diagram illustrating the number of pieces of fixed AP measurement data for each period in a table format.

FIG. 5 is a diagram illustrating the number of pieces of measurement data corresponding to a target AP for each period in a table format.

DESCRIPTION OF EMBODIMENTS

Hereinafter, an embodiment of the present invention will be described in detail with reference to the accompanying drawings. In description of the drawings, the same or corresponding elements will be referred to by the same reference signs and description thereof will not be repeated.

Figure 1:
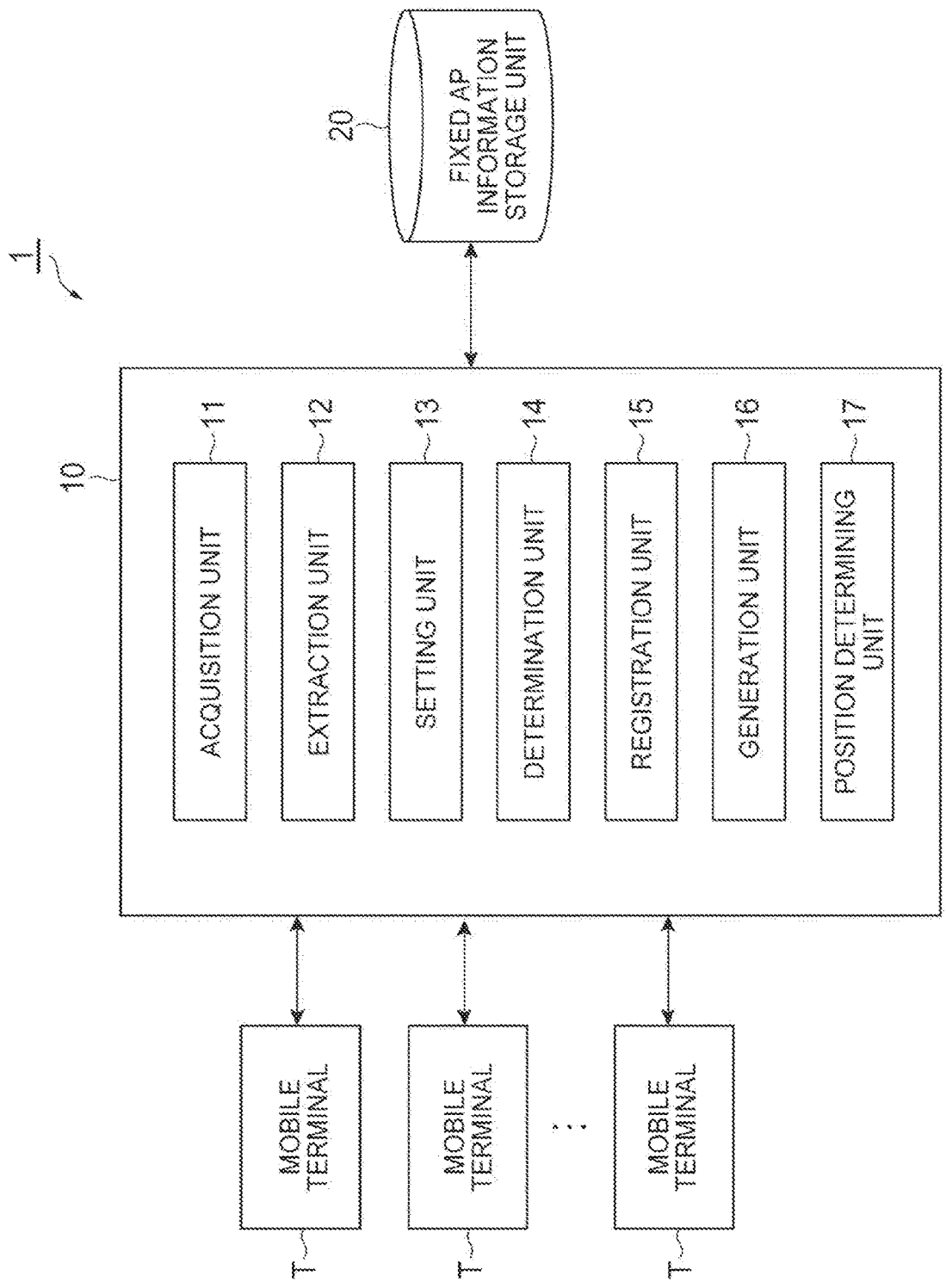
FIG. 1 is a diagram illustrating the overall configuration of a positioning system including a server which is an information processing device according to an embodiment.

FIG. 1 is a diagram illustrating the overall configuration of a positioning system 1 including a server 10 which is an information processing device according to an embodiment of the invention. The positioning system 1 includes a server 10, a fixed AP information storage unit 20, and a plurality of mobile terminals T. The positioning system 1 is a system in which the server 10 determines (estimates) a staying position of a mobile terminal T. Examples of the staying position of a mobile terminal T include points of interest (POIs) such as buildings, stores, and various facilities.

Each mobile terminal T is a device that is carried by a user and examples thereof include a smartphone, a mobile phone, a tablet terminal, and a personal digital assistant (PDA). The mobile terminal T has a function of accessing a communication network such as a mobile communication network and performing radio communication. The mobile terminal T is configured to perform data communication with the server 10 by radio communication. The mobile terminal T has a function of receiving radio waves that are emitted from a radio access point such as a Wi-Fi access point and acquiring information of the radio access point (such as an SSID and a reception intensity). The mobile terminal has a function of measuring a position of the mobile terminal T, for example, using a GPS.

The server 10 is a device that determines a staying position (a store in this embodiment) of a mobile terminal T (that is, a user who carries the mobile terminal T). The server 10 has a function of performing two phases including a learning phase and a staying position determination phase. The learning phase is a phase in which machine learning for generating a model (a prediction model or a prediction function) which is used for the staying position determination phase is performed. The staying position determination phase is a phase in which a staying position (such as a store) of a mobile terminal T is determined using the model generated in the learning phase. This determination of a staying position can be used for determination of entrance into a geo-fence (a preset monitoring area such as a store) (check-in determination) or the like. For example, in an area in which a plurality of stores are concentrated, a mobile terminal T receives radio waves from a plurality of radio access points which are provided in the stores or the like. That is, even when a mobile terminal T receives radio waves from a radio access point which is provided in a certain store, the store cannot be immediately determined to be a staying position of the mobile terminal T. In this case, it is possible to accurately perform check-in determination on the basis of states of radio waves from the radio access points using the above-mentioned model.

In the learning phase, first, the server 10 acquires a plurality of pieces of learning data including identification information for identifying a radio access point which is a radio wave transmitting device from which radio waves have been received by a mobile terminal T, a reception intensity of radio waves in the mobile terminal T, and information (correct answer data) indicating a store in which the mobile terminal T stayed when the radio waves were received from one or more mobile terminals T. In this embodiment, the radio access point is a Wi-Fi access point and the identification information is a basic service set identifier (BSSID) for identifying the Wi-Fi access point. Here, a combination of the radio access point and the identification information thereof is not limited to this example.

In general, a mobile terminal T simultaneously receives radio waves from a plurality of radio access points. As described above, it is thought that it is possible to improve determination accuracy of a staying position of a mobile terminal T using a reception intensity of radio waves from a plurality of radio access points. Accordingly, one piece of learning data includes a preset number of (for example, N (N>1)) pieces of group information (a group of identification information and a reception intensity). When a mobile terminal T simultaneously receives radio waves from less than N radio access points, for example, a blank area (a remaining area in an area which is prepared as an area for storing N pieces of group information) of learning data may be replenished with, for example, preset supplement data. On the other hand, when a mobile terminal T simultaneously receives radio waves from greater than N radio access points, the plurality of radio access points may be sorted on the basis of priority levels determined according to a predetermined rule and group information on N higher radio access points may be included in the learning data. Replenishment with the supplement data and selection of group information included in the learning data may be performed by the mobile terminal T side or may be performed by the server 10 side. That is, the mobile terminal T may construct learning data by performing replenishment with the supplement data or selection of group information and transmit the learning data to the server 10. Alternatively, the server 10 having received all the group information from the mobile terminal T may construct learning data by performing replenishment with the supplement data or selection of group information.

Subsequently, the server 10 generates a model by performing machine learning (for example, a known method such as deep learning) using a plurality of pieces of learning data acquired from one or more mobile terminals T as described above. The model is a model that receives an input of data (N pieces of group information in this embodiment) corresponding to data sets other than correct answer data out of the learning data and outputs (determines) a staying position.

In the staying position determination phase, the server 10 acquires input data (N pieces of group information in this embodiment) from the mobile terminal T to be determined and inputs the input data to the model. Then, the server 10 acquires the output result of the model as the staying position of the mobile terminal T.

Radio access points from which radio waves can be received by a mobile terminal T can include a movable radio access point (hereinafter referred to as a "movable AP") of which a position is not fixed such as a mobile Wi-Fi router. A reception intensity of radio waves from a movable AP serves as noise in determining (estimating) a staying position of a mobile terminal T and serves as a factor for decreasing accuracy of the model. Specifically, since a position of a movable AP may differ between at the time of generating a model (at the time of learning) and at the time of using the model, data associated with the reception intensity of radio waves from the movable AP is not helpful for estimating a position of a mobile terminal T. Accordingly, it is preferable that data associated with the reception intensity of radio waves from a movable AP be excluded from learning data for the model and input data at the time of using the model.

Therefore, the server 10 determines whether or not a radio access point is a fixed access point (hereinafter referred to as a "fixed AP") fixed to a specific place, for which it is unknown whether or not the radio access point is a fixed AP. The server 10 uses only data associated with radio access points which are fixed APs (specifically, radio access points which are ascertained to be a fixed AP in advance or radio access points which are determined to be a fixed AP in the determination) as learning data for the model. Through this process, the server 10 can appropriately exclude data associated with movable APs from the learning data for generating the model.

As illustrated in FIG. 1, the server 10 includes an acquisition unit 11, an extraction unit 12, a setting unit 13, a determination unit 14, a registration unit 15, a generation unit 16, and a position determining unit 17 to perform the above-mentioned processes. The acquisition unit 11, the extraction unit 12, the setting unit 13, the determination unit 14, the registration unit 15, and the generation unit 16 are functional elements for performing the learning phase. The position determining unit 17 is a functional element for performing the staying position determination phase.

The acquisition unit 11 acquires one or more pieces of measurement data from one or more mobile terminals T. One piece of measurement data includes a BSSID (identification information) for identifying a radio access point from which radio waves have been received by a mobile terminal T, a reception intensity of the radio waves in the mobile terminal T, a measurement time corresponding to a time at which the mobile terminal T has received the radio waves, and position information indicating the position of the mobile terminal T corresponding to the measurement time.

FIG. 2 is a diagram illustrating an example of measurement data. In the example illustrated in FIG. 2, data (record) corresponding to one row corresponds to one piece of measurement data. The latitude and longitude is information corresponding to the position information. The position information (latitude and longitude) is a positioning result which is acquired by a positioning function (for example, a GPS) of a mobile terminal T. A service set identifier (SSID) is an identifier indicating a manager of a radio access point. In this embodiment, the same SSID can be allocated to a plurality of radio access points (radio access points to which different BSSIDs are allocated) which are managed by the same manager. The reception intensity in the example illustrated in FIG. 2 is a value using dBm as the unit, and a value closer to 0 represents a greater reception intensity. The reception intensity is not limited to this example and, for example, a received signal strength indicator (RSSI) value may be used as the reception intensity.

The measurement time does not have to strictly match the time at which the mobile terminal T has received radio waves (or the time at which the positioning result has been acquired). That is, the measurement data is information in which position information (latitude and longitude) and radio wave information (an SSID, a BSSID, and a reception intensity) which are acquired substantially at the same time as the measurement time are correlated with each other.

In each mobile terminal T, the measurement data can be generated and accumulated at the time point at which the check-in determination has been performed, for example, with determination of check-in into an arbitrary geo-fence as a trigger. The determination of check-in into an arbitrary geo-fence may be performed, for example, by a function of a predetermined application implemented in the mobile terminal T without a user's operation or may be performed by a user's input operation to the mobile terminal T (that is, an operation of explicitly inputting a geo-fence (a store in this embodiment) where a user is currently located).

The acquisition unit 11 receives one or more pieces of measurement data generated and accumulated in the mobile terminals T from the mobile terminals T periodically (or in response to a predetermined trigger). Through this process, the measurement data generated in the mobile terminals T is accumulated in the server 10. The measurement data may be correlated with identification information such as a terminal ID (or a user ID) for identifying a mobile terminal T (or a user of the mobile terminal T) for the purpose of ascertaining the mobile terminal T from which data has been acquired.

The extraction unit 12 extracts measurement data including a BSSID of a specific fixed AP as fixed AP measurement data with reference to the fixed AP information storage unit 20 in which the BSSID of one or more radio access points (fixed APs) of which an installation position is fixed is stored. Specifically, the extraction unit 12 refers to fixed AP information which is stored in the fixed AP information storage unit 20. The fixed AP information storage unit 20 is a database storing fixed AP information, or the like. The fixed AP information storage unit 20 may be an external device which can be accessed by the server 10 as illustrated in FIG. 1, or may be implemented in a memory, a storage, or the like which is provided in the server 10.

FIG. 3 is a diagram illustrating an example of fixed AP information which is stored in the fixed AP information storage unit 20. In the example illustrated in FIG. 3, data (record) corresponding to one row corresponds to one piece of fixed AP information. One piece of fixed AP information includes an SSID, a BSSID, and installation position information of one fixed AP. For example, the installation position information includes position coordinates (latitude and longitude) and a POI name (a store name) of a place in which a fixed AP corresponding to a BSSID (a fixed AP which is uniquely identified by a BSSID) is installed.

In this embodiment, as illustrated in FIG. 2, measurement data associated with a radio access point with a BSSID of "aa:aa:aa:aa:aa:01" (first data in FIG. 2) is acquired by the acquisition unit 11. As illustrated in FIG. 3, fixed AP information on the radio access point (first data in FIG. 3) is stored in the fixed AP information storage unit 20. Accordingly, the radio access point with a BSSID of "aa:aa:aa:aa:aa:01" can be selected as a specific fixed AP by the extraction unit 12. In this case, the extraction unit 12 extracts measurement data (first data in FIG. 2) associated with the radio access point with a BSSID of "aa:aa:aa:aa:aa:01" (hereinafter referred to as a "specific fixed AP") as fixed AP measurement data.

A plurality of pieces of measurement data associated with a specific fixed AP can be included in a plurality of pieces of measurement data acquired by the acquisition unit 11. In this case, the extraction unit 12 extracts the plurality of pieces of measurement data as fixed AP measurement data.

The setting unit 13 sets a radio access point which is a target for determining whether it corresponds to a fixed AP (hereinafter referred to as a "target AP") out of the measurement data acquired by the acquisition unit 11. Specifically, the setting unit 13 extracts measurement data corresponding to a radio access point which may be fixed to a position relatively close to the installation position of the specific fixed AP as target measurement data out of measurement data including a non-stored BSSID which is not stored in the fixed AP information storage unit 20 (that is, a BSSID of a radio access point which is not registered as a fixed AP). In this embodiment, for example, the setting unit 13 extracts the target measurement data as follows.

First, as a first extraction process, the setting unit 13 extracts measurement data including a measurement time of which a difference from the measurement time included in the fixed AP measurement data is equal to or less than a predetermined threshold value (for example, 1 second). In the example illustrated in FIG. 2, the measurement times (01:41:1 on September 19) of measurement data with a BSSID of "xx:xx:xx:xx:xx:02" (second data in FIG. 2, which is hereinafter referred to as "first measurement data") and measurement data with a BSSID of "xx:xx:xx:xx:xx:03" (third data in FIG. 2, which is hereinafter referred to as "second measurement data") are the same as the measurement time of the fixed AP measurement data (first data in FIG. 2). That is, both the first measurement data and the second measurement data satisfy the above conditions. In this case, the setting unit 13 extracts the first measurement data and the second measurement data as candidates for the target measurement data in the first extraction process.

Then, the setting unit 13 may update the measurement data which is extracted as the candidates for the target measurement data in the first extraction process using an SSID list which is prepared in advance. Here, the SSID list is, for example, information including a list of SSIDs which are to be determined and which are defined in advance by an operator or the like (a white list) or a list of SSIDs which are not to be determined (a black list). For example, when a white list is prepared in advance, the setting unit 13 may exclude measurement data associated with a radio access point corresponding to an SSID which is not entered in the white list out of the measurement data extracted in the first extraction process from the candidates for the target measurement data. On the other hand, when a black list is prepared, the setting unit 13 may exclude measurement data associated with a radio access point corresponding to an SSID which is entered in the black list out of the measurement data extracted in the first extraction process from the candidates for the target measurement data. For example, by adding an SSID correlated with a radio access point which has been already determined to be a movable AP to the black list, a useless determination process (a process which is continuously performed by the setting unit 13) associated with a radio access point corresponding to the SSID can be skipped.

Then, as a second extraction process, the setting unit 13 extracts measurement data including position information of which a distance from an installation position of a specific fixed AP (a position indicated by the latitude and longitude included in the installation position information) is equal to or less than a predetermined threshold value (for example, 100 m) out of the measurement data which remains after the updating process using the SSID list as a candidate for the target measurement data. In the example illustrated in FIG. 2, the position information (latitude: 35.609897, longitude: 139.742252) of the first measurement data and the second measurement data is the same as the installation position of the specific fixed AP (latitude: 35.609897, longitude: 139.742252). Accordingly, both the first measurement data and the second measurement data satisfy the above conditions. In this case, the setting unit 13 extracts the first measurement data and the second measurement data as candidates for the target measurement data in the second extraction process.

Then, as a third extraction process, the setting unit 13 extracts measurement data including a reception intensity of which a difference from the reception intensity (−56 dBm) included in the fixed AP measurement data is equal to or less than a predetermined threshold value (for example, 10 dBm) out of the measurement data which remains after the second extraction process as the target measurement data. In the example illustrated in FIG. 2, the first measurement data with a reception intensity of "−60 dBm" satisfies the above conditions. On the other hand, the second measurement data with a reception intensity of "−70 dBm" does not satisfy the above conditions. Accordingly, the setting unit 13 extracts the first measurement data as final target measurement data in the third extraction process.

Finally, the setting unit 13 sets the radio access point corresponding to the BSSID included in the target measurement data as a target AP. In the example illustrated in FIG. 2, the radio access point corresponding to the BSSID "xx:xx:xx:xx:xx:02" of the first measurement data is set as the target AP.

As described above, a plurality of pieces of fixed AP measurement data (that is, measurement data including the BSSID of "aa:aa:aa:aa:aa:01" of the specific fixed AP) can be included in a plurality of pieces of measurement data acquired in a predetermined period (for example, one week). In this case, the setting unit 13 can perform the above-mentioned processes on each of the plurality of pieces of fixed AP measurement data. In the example illustrated in FIG. 2, the number of radio access points which are determined to be a target AP is only one, but a plurality of radio access points may be actually determined to be target APs. The order of processes which are performed by the setting unit 13 is not limited to the above-mentioned example (the first extraction process→the updating process using an SSID list→the second extraction process→the third extraction process), and the order of processes may be changed. The updating process using an SSID list may be skipped when the SSID list is not prepared in advance.

The determination unit 14 determines whether the target AP is a radio access point fixed to a predetermined installation position (that is, corresponds to a fixed AP) on the basis of the measurement data including the BSSID corresponding to the target AP set by the setting unit 13 and the fixed AP measurement data. That is, the determination unit 14 determines whether the target AP is a radio access point which is fixed to a position in a predetermined range from the installation position of the specific fixed AP. Here, the "measurement data including a BSSID corresponding to the target AP" can also include measurement data which has not been extracted as the target measurement data in addition to the target measurement data extracted by the setting unit 13. A first example and a second example of the process routine which is performed by the determination unit 14 will be described below. When there are a plurality of target APs which are set by the setting unit 13, the process routine of the determination unit 14 which will be described below is independently performed on each target AP.

First Example

In the first example, the determination unit 14 determines whether the target AP corresponds to a fixed AP on the basis of the frequency in which radio waves from the specific fixed AP and radio waves from the target AP are simultaneously received. Specifically, when an appearance frequency of the target measurement data (that is, measurement data which is finally extracted by the setting unit 13) is equal to or greater than a predetermined threshold value, the determination unit 14 determines that the target AP corresponds to a fixed AP. For example, the determination unit 14 calculates a ratio (N2/N1) of the number of pieces of target measurement data N2 to the number of pieces of measurement data (that is, the total number N1) including the BSSID corresponding to the target AP as an appearance frequency of the target measurement data with reference to all the measurement data acquired by the acquisition unit 11 in a predetermined period. An occurrence frequency of a situation in which a predetermined mobile terminal T receives radio waves with the same magnitude of reception intensity from a specific fixed AP when receiving radio waves with a predetermined reception intensity from the target AP becomes higher as the ratio (N2/N1) becomes higher. A high occurrence frequency of such a situation means that there is a high likelihood that the target AP will be fixed to the vicinity of an installation position of a specific fixed AP. Accordingly, it is possible to appropriately determine whether the target AP is a fixed AP on the basis of whether the ratio (N2/N1) is equal to or greater than a threshold value.

For example, the appearance frequency of target measurement data may be an index value indicating at what ratio the target measurement data has been observed (acquired) by a mobile terminal T. For example, the determination unit 14 may calculate a ratio (N4/N3) of the number of mobile terminals T N4 having target measurement data to the number of mobile terminals T N3 (the total number) having acquired measurement data including the BSSID corresponding to the target AP as an appearance frequency of the target measurement data. For example, the determination unit 14 may calculate a ratio (for example, days) at which target measurement data has been observed in a predetermined period (for example, one week) in which measurement data has been collected by the acquisition unit 11 as the appearance frequency of the target measurement data. The threshold value which is used for the determination can be set on the basis of an index value which is employed as the appearance frequency of the target measurement data.

In the first example, the target measurement data is data which is extracted from the measurement data including the BSSID corresponding to the target AP on the basis of a result of comparison with fixed AP measurement data as described above. Accordingly, determination based on the appearance frequency of target measurement data as described above corresponds to determination based on the measurement data including the BSSID corresponding to the target AP and the fixed AP measurement data.

Second Example

In the second example, the determination unit 14 determines whether a target AP corresponds to a fixed AP on the basis of a degree of similarity between reception patterns of radio waves (connection patterns) every predetermined period (for example, every timeslot or every day). Specifically, first, the determination unit 14 totals the number of pieces of fixed AP measurement data and the number of pieces of measurement data including the BSSID of the target AP every two or more predetermined periods (168 (=7×24) periods into which days of a week are divided into single hours in this embodiment) with reference to all the measurement data acquired by the acquisition unit 11.

FIG. 4 is a diagram illustrating the number of pieces of fixed AP measurement data for every period in a table format. In the table illustrated in FIG. 4, timeslots (0 to 23) are represented in the vertical direction and days (SUN to SAT) are represented in the horizontal direction. For example, a numerical value "27 in a cell which is defined by a timeslot "10" and a day "TUE" indicates the number of pieces of fixed AP measurement data (measurement data with a BSSID of "aa:aa:aa:aa:aa:01") of which the measurement time is included in a period from 10:00 to 11:00 on a specific Tuesday. The number is a value based on the number of radio waves from the specific fixed AP which have been received by a mobile terminal T in the period of from 10:00 to 11:00 on the specific Tuesday. In this embodiment, the value is the number of times radio waves from the specific fixed AP have been received at a timing at which measurement data is generated in the mobile terminal T (for example, a time point at which check-in into a predetermined geo-fence is determined).

Similarly, FIG. 5 is a diagram illustrating the number of pieces of measurement data including a BSSID of "xx:xx:xx:xx:xx:02" corresponding to the target AP every period in a table format. The numerical value in a specific cell in the table illustrated in FIG. 5 is a value based on the number of radio waves from the target AP which have been received by a mobile terminal T in a period corresponding to the cell. In this embodiment, the value is the number of times radio waves from the target AP have been received at a timing at which measurement data is generated in the mobile terminal T (for example, a time point at which check-in into a predetermined geo-fence is determined).

Then, the determination unit 14 calculates a degree of similarity between an appearance pattern of fixed AP measurement data in a plurality of periods and an appearance pattern of measurement data including the BSSID corresponding to the target AP on the basis of the totaled results illustrated in FIGS. 4 and 5. For example, the determination unit 14 acquires a vector Va of 168 dimensions which is expressed by Expression 1 as a vector indicating the appearance pattern of the fixed AP measurement data by scanning the numerical values in the cells included in the table illustrated in FIG. 4 in the order indicated by a dotted line. Similarly, the determination unit 14 acquires a vector Vx of 168 dimensions which is expressed by Expression 2 as a vector indicating the appearance pattern of the measurement data including the BSSID corresponding to the target AP by scanning the numerical values in the cells included in the table illustrated in FIG. 5 in the order indicated by a dotted line (the same order as the order employed for generating the vector Va). In this case, for example, the determination unit 14 can use Dax which is calculated by Expression 3 (that is, a distance between the vector Va and the vector Vx) as the degree of similarity. In Expression 3, ai denotes an i-th element of the vector Va, and xi denotes an i-th element of the vector Vx.

$$Va = (2,2,2,4,6,11,18,4,3,2,\ldots) \quad \text{Expression 1:}$$

$$Vx = (5,4,3,8,12,22,36,3,2,2,\ldots) \quad \text{Expression 2:}$$

$$Dax = \sqrt{(\Sigma_i(ai-xi)^2)} \quad \text{Expression 3:}$$

Then, the determination unit 14 determines whether the target AP is a fixed AP on the basis of the degree of similarity (Dax herein). As the value of Dax becomes less, the degree of similarity between the appearance pattern of the fixed AP measurement data and the appearance pattern of the measurement data including the BSSID corresponding to the target AP becomes higher. As the degree of similarity between the appearance patterns increases, an occurrence frequency of a situation in which a predetermined mobile terminal T also receives radio waves from the specific fixed AP when receiving radio waves with a predetermined reception intensity from the target AP increases. A high occurrence frequency of such a situation means that there is a high likelihood that the target AP is fixed to the vicinity of the installation position of the specific fixed AP. Accordingly, the determination unit 14 compares Dax with a predetermined threshold value and can determine that the target AP is a fixed AP when Dax is equal to or less than the threshold value.

As described above, the determination unit 14 can appropriately determine whether the target AP is a fixed AP (more specifically, whether the target AP is fixed to a position in a predetermined range from the installation position of the specific fixed AP) by performing the determination processes described in the first example and the second example. The determination method which is performed by the determination unit 14 is not limited to the examples. For example, the determination unit 14 may perform the determination processes of both the first example and the second example and finally determine that the target AP is a fixed AP when it is determined in at least one of the first example and the second example that the target AP is a fixed AP. Alternatively, for the purpose of further enhancement in determination accuracy, the determination unit 14 may finally determine that the target AP is a fixed AP only when it is determined in both the first example and the second example that the target AP is a fixed AP.

The registration unit 15 registers a BSSID corresponding to the target AP which has been determined to be a fixed AP by the determination unit 14 as a BSSID of a new fixed AP in the fixed AP information storage unit 20. In the determination which is performed by the determination unit 14, it is determined that a target AP with a high likelihood that it is fixedly installed substantially at the same position as the specific fixed AP is a fixed AP. Therefore, the registration unit 15 may register information in which installation position information of the specific fixed AP (latitude "35.609897," longitude "139.742252," and POI name "Store A" in this embodiment) is correlated with the SSID and the BSSID corresponding to the target AP as new fixed AP information (information corresponding to one record in FIG. 3) in the fixed AP information storage unit 20. In this way, by registering a target AP which has been determined to be a fixed AP by the determination unit 14 as a new fixed AP in the fixed AP information storage unit 20, it is possible to determine whether an undetermined radio access point is a fixed AP on the basis of the newly added fixed AP. Accordingly, with the registration unit 15, it is possible to efficiently perform determination of a radio access point which has not been determined by repeatedly performing the processes of the acquisition unit 11, the extraction unit 12, the setting unit 13, and the determination unit 14 while gradually increasing the number of fixed APs which are registered as fixed AP information.

The generation unit 16 generates the model described above. That is, the generation unit 16 generates a model that receives an input of learning data including BSSIDs and reception intensities corresponding to one or more radio access points from which radio waves have been received by one mobile terminal T and outputs a staying position of the mobile terminal T. The generation unit 16 does not use data including a BSSID not corresponding to BSSIDs of fixed APs (which includes a BSSID corresponding to a target AP which has been determined to be a radio access point fixed to a predetermined installation position by the determination unit 14 in this embodiment) stored in the fixed AP information storage unit 20 as learning data. That is, data including a BSSID of a radio access point (that is, a radio access point with a likelihood of a movable AP) other than radio access points which are ascertained to be a fixed AP in advance (or which have been determined by the determination unit 14) is excluded from learning data for generating a model. When a registration process is not performed by the registration unit 15, the generation unit 16 may not use data including a BSSID which does not correspond to the BSSIDs of the fixed APs stored in the fixed AP information storage unit 20 and a BSSID corresponding to a target AP which has been determined to a radio access point fixed to a predetermined installation position by the determination unit 14 as the learning data. In this way, by excluding data associated with a radio access point with a likelihood of a movable AP (that is, data serving as noise which is not helpful for estimating a position of a mobile terminal T) from learning data and generating a model, it is possible to enhance determination accuracy of the model.

The generation unit 16 may determine priorities for attributes of radio access points and preferentially use data corresponding to a radio access point having an attribute with a high priority as learning data. For example, each radio access point is correlated with predetermined attributes (for example, an SSID, an area owner who manages a plurality of SSIDs, and a frequency band of radio waves which are emitted from a radio access point). The generation unit 16 may preferentially use data including a BSSID corresponding to a radio access point correlated with an attribute for which the number of times of reception of radio waves is large as input data with reference to the totaling result of the number of times radio waves have been received by a mobile terminal for each attribute. More specifically, for example, the generation unit 16 refers to the totaling result of the number of times radio waves of a radio access point (a fixed AP) installed in each geo-point (POI) have been received by a mobile terminal T within a predetermined period (the check-in number). The generation unit 16 sorts the attributes of the radio access points in the descending order of check-in numbers and sets priorities of the attributes such that a higher priority is assigned to a higher attribute. The generation unit 16 can select group information included in the learning data (select higher N pieces of group information) on the basis of the priorities which are set as described above. In this process, the number of unique users (a value obtained by counting a plurality of check-in times by the same user as one check-in time) may be used instead of the check-in number (a value obtained by counting a plurality of check-in times by the same user (mobile terminal T) as different check-in times). With this process, it is possible to preferentially use data associated with a radio access point with high check-in efficiency as learning data. That is, data of radio access points from which radio waves can be easily received by many mobile terminals T and from which the number of samples required for appropriately performing learning for generating a model can be easily secured can be employed as learning data. As a result, it is possible to more effectively enhance determination accuracy of a model.

In the staying position determination phase, the position determining unit 17 acquires input data (N pieces of group information in this embodiment) from a mobile terminal T which is to be determined and inputs the input data to the model which is generated by the generation unit 16. Similarly to the learning data, data including a BSSID of a radio access point with a likelihood of a movable AP is excluded from the input data which is input to the model. The position determining unit 17 acquires the output result of the model as the staying position of the mobile terminal T. With the position determining unit 17, in a situation in which a mobile terminal T stays in an area in which a plurality of stores are concentrated and radio waves from a plurality of radio access points are received by the mobile terminal T, it is possible to accurately determine a staying position (a staying store) of the mobile terminal T. Data (noise) including a BSSID of a radio access point with a likelihood of a movable AP is not included in the input data which is input to the model. As a result, in comparison with a case in which such noise is included in the input data, it is possible to accurately determine a staying position of a mobile terminal T.

Figure 6:
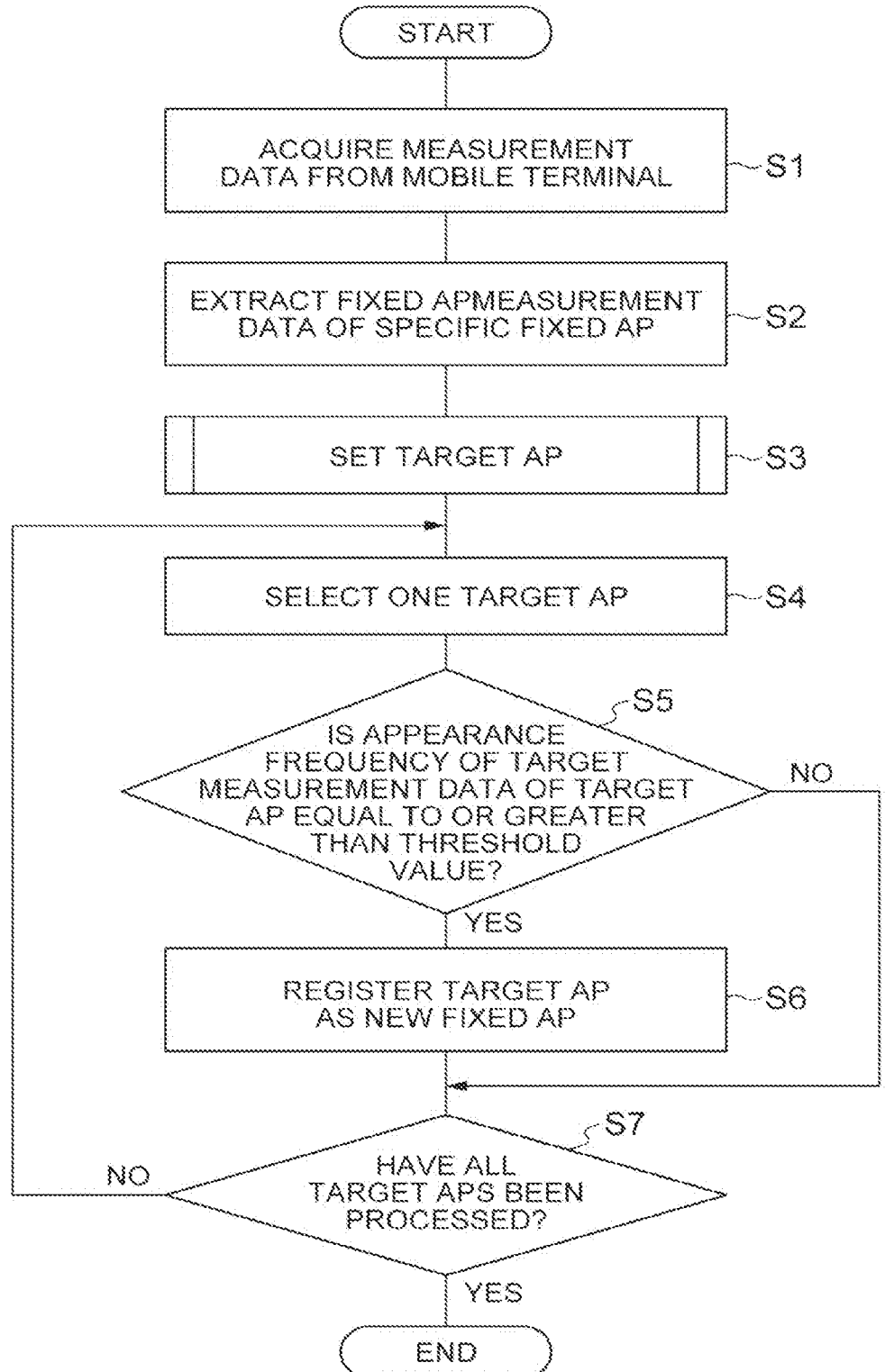
FIG. 6 is a flowchart illustrating an example of an operation of the server.
Figure 7:
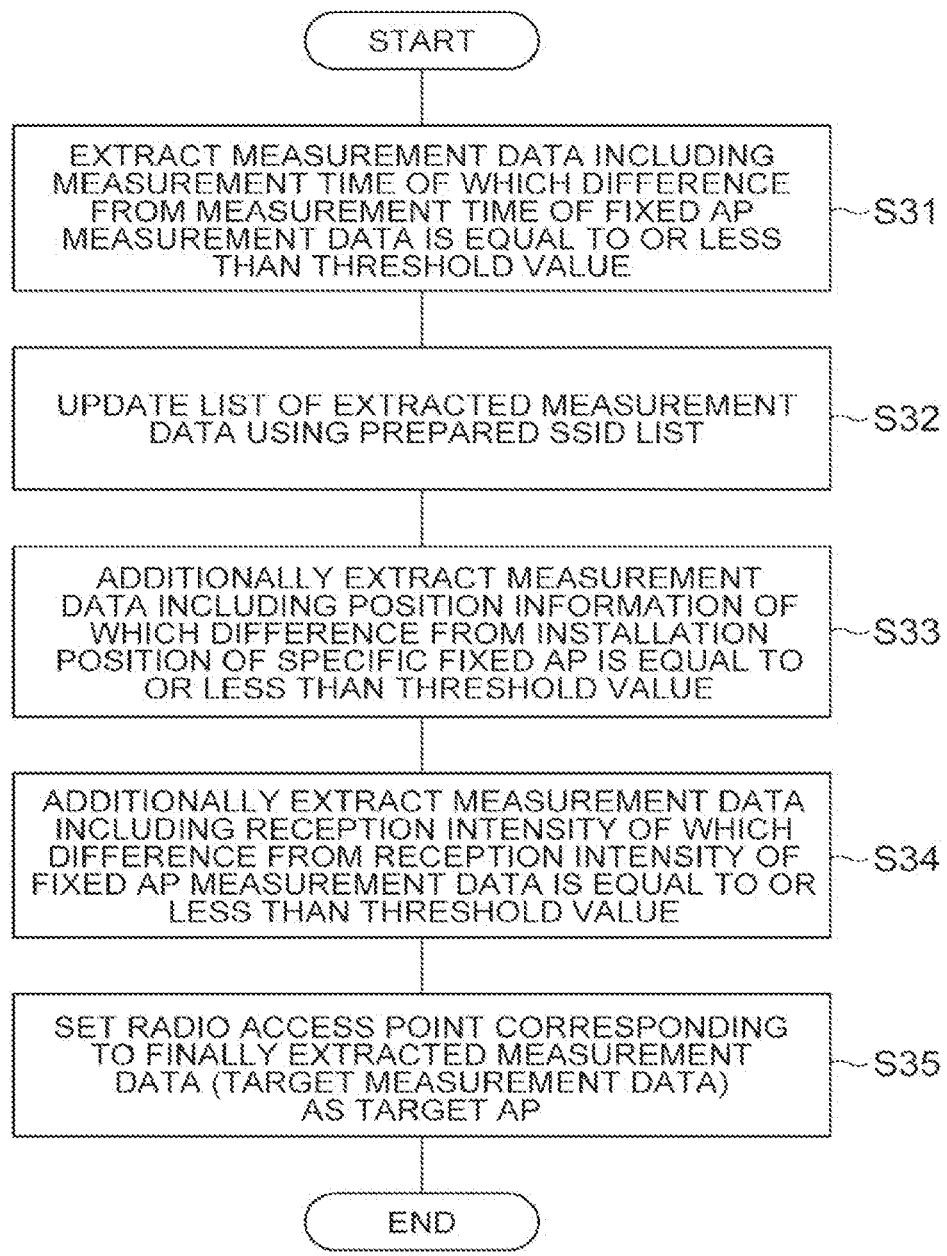
FIG. 7 is a flowchart illustrating an example of the process of Step S3 in FIG. 6.

An example of an operation of the server 10 will be described below with reference to FIGS. 6 and 7. FIG. 6 is a flowchart illustrating an example of a process of determining whether a radio access point is a fixed AP in the learning phase. FIG. 7 is a flowchart illustrating an example of the process of Step S3 in FIG. 6.

In Step S1, the acquisition unit 11 acquires one or more pieces of measurement data (see FIG. 2) from one or more mobile terminals T. For example, the acquisition unit 11 acquires measurement data including measurement times included in a predetermined period (for example, one week) as data to be processed.

In Step S2, the extraction unit 12 extracts measurement data (first data in FIG. 3) including a BSSID of a specific fixed AP (for example, "aa:aa:aa:aa:aa:01" in this embodiment) as fixed AP measurement data with reference to the fixed AP information storage unit 20.

In Step S3, the setting unit 13 sets a radio access point (a target AP) for which it is determined whether it is a fixed AP out of the measurement data acquired by the acquisition unit 11. An example of the process of Step S3 will be described below with reference to FIG. 7.

In Step S31, the setting unit 13 extracts measurement data including a measurement time from which a difference from the measurement time included in the fixed AP measurement data is equal to or less than a predetermined threshold value (for example, 1 second) as the first extraction process. As described above, in this embodiment, the first measurement data and the second measurement data (second data and third data in FIG. 2) are extracted as candidates for target measurement data.

In Step S32, the setting unit 13 updates the measurement data which is extracted as candidates for target measurement data in the first extraction process using an SSID list which has been prepared in advance.

In Step S33, the setting unit 13 extracts measurement data including position information from which a distance from the installation position of the specific fixed AP is equal to or less than a predetermined threshold value (for example, 100 m) as candidates for target measurement data from the measurement data which are left after the process of Step S32 has been performed as the second extraction process. As described above, in this embodiment, the first measurement data and the second measurement data are extracted as candidates for target measurement data.

In Step S34, the setting unit 13 extracts measurement data including a reception intensity from which a difference from the reception intensity (−56 dBm) included in the fixed AP measurement data is equal to or less than a predetermined threshold value (for example, 10 dBm) out of measurement data which remains after the process of Step S33 has been performed as candidates for target measurement data as the third extraction process. As described above, in this embodiment, the first measurement data is finally extracted as target measurement data.

In Step S35, the setting unit 13 sets a radio access point corresponding to the BSSID included in the target measurement data as a target AP. In the example illustrated in FIG. 2, the radio access point corresponding to the BSSID "xx:xx:xx:xx:xx:02" of the first measurement data is set as the target AP.

Processes after the target AP has been determined in Step S3 will be described below with reference back to FIG. 6. The processes of Step S4 and steps subsequent thereto are based on the premise that one or more radio access points are determined as a target AP in Step S3. When there is no radio access point which is determined as a target AP in Step S3, the server 10 ends the process routine at that time point.

In Step S4, the determination unit 14 selects one target AP out of one or more radio access points which are determined as the target AP in Step S3.

In Step S5, the determination unit 14 performs the determination process of the first example described above. That is, the determination unit 14 determines whether an appearance frequency of target measurement data of the target AP selected in Step S4 is equal to or greater than a threshold value. When it is determined that the appearance frequency of the target measurement data is equal to or greater than the threshold value (Step S5: YES), the process of Step S6 is performed. On the other hand, when it is determined that the appearance frequency of the target measurement data is not equal to or greater than the threshold value (Step S5: NO), the process of Step S6 is skipped. The determination process which is performed in Step S5 by the determination unit 14 is not limited to the above example (the first example). For example, the determination unit 14 may perform the determination process of the second example, or may perform the determination processes of both the first example and the second example.

In Step S6, the registration unit 15 registers the BSSID corresponding to the target AP which is determined to be a fixed AP by the determination unit 14 as a BSSID of a new fixed AP in the fixed AP information storage unit 20.

Until the processes are completely performed on all the radio access points which are determined to be a target AP in Step S3, the processes of Step S4 and steps subsequent thereto are repeatedly performed (Step S7: NO).

Measurement data corresponding to a plurality of different fixed APs may be included in a plurality of pieces of measurement data acquired in Step S1. In this case, the server 10 can perform the processes when each fixed AP is set as a specific fixed AP (the processes of Steps S2 to S7) for each fixed AP.

As described above, the server 10 includes the acquisition unit 11, the extraction unit 12, the setting unit 13, and the determination unit 14. The acquisition unit acquires one or more pieces of measurement data including a BSSID for identifying a radio access point from which radio waves have been received by a mobile terminal T, a reception intensity of the radio waves in the mobile terminal T, a measurement time corresponding to a time at which the radio waves have been received by the mobile terminal T, and position information indicating a position of the mobile terminal T corresponding to the measurement time from one or more mobile terminals. The extraction unit 12 extracts the measurement data including the BSSID of a specific fixed AP as fixed AP measurement data with reference to the fixed AP information storage unit 20 in which BSSIDs of one or more fixed APs which are radio access points of which an installation position is fixed and installation position information indicating the installation position are stored. The setting unit 13 extracts the measurement data including the measurement time of which a difference from the measurement time included in the fixed AP measurement data is equal to or less than a predetermined threshold value (1 second in this embodiment), the position information of which a difference from the installation position of the specific fixed AP is equal to or less than a predetermined threshold value (100 m in this embodiment), and the reception intensity of which a difference from the reception intensity included in the fixed AP measurement data is equal to or less than a predetermined threshold value (10 dBm in this embodiment) as target measurement data, and sets the radio access point corresponding to the BSSID included in the target measurement data as a target AP. The determination unit 14 determines whether the target AP is a radio access point which is fixed to a predetermined installation position on the basis of the measurement data including the BSSID corresponding to the target AP and the fixed AP measurement data.

In the server 10, for example, through the first to third extraction processes described above, measurement data including a measurement time of which a difference from the measurement time included in the fixed AP measurement data is equal to or less than the predetermined threshold value, position information of which a difference from the installation position of the specific fixed AP is equal to or less than the predetermined threshold value, and a reception intensity of which a difference from the reception intensity included in the fixed AP measurement data is equal to or less than the predetermined threshold value is extracted as the target measurement data. The radio access point corresponding to the BSSID included in the target measurement data is set as a target AP. With this process, it is possible to appropriately extract a radio access point which may be fixed to a position close to the installation position of a specific fixed AP as a target AP. With the server 10, whether the target AP is a radio access point fixed to a predetermined installation position (that is, a radio access point which is useful for estimating the position of a mobile terminal T) is determined on the basis of the measurement data including the BSSID corresponding to the target AP and the fixed AP measurement data. As a result, it is possible to appropriately extract a radio access point which is useful for estimating a position of a mobile terminal T.

The block diagram (FIG. 1) which is used above for description of the embodiment illustrate blocks of functional units. Such functional blocks (functional units) are realized by an arbitrary combination of hardware and/or software. A means for realizing each functional block is not particularly limited. That is, each functional block may be realized by a single device which is physically and/or logically combined or may be realized by two or more devices which are physically and/or logically separated and which are directly and/or indirectly linked to each other (for example, in a wired and/or wireless manner).

Figure 8:
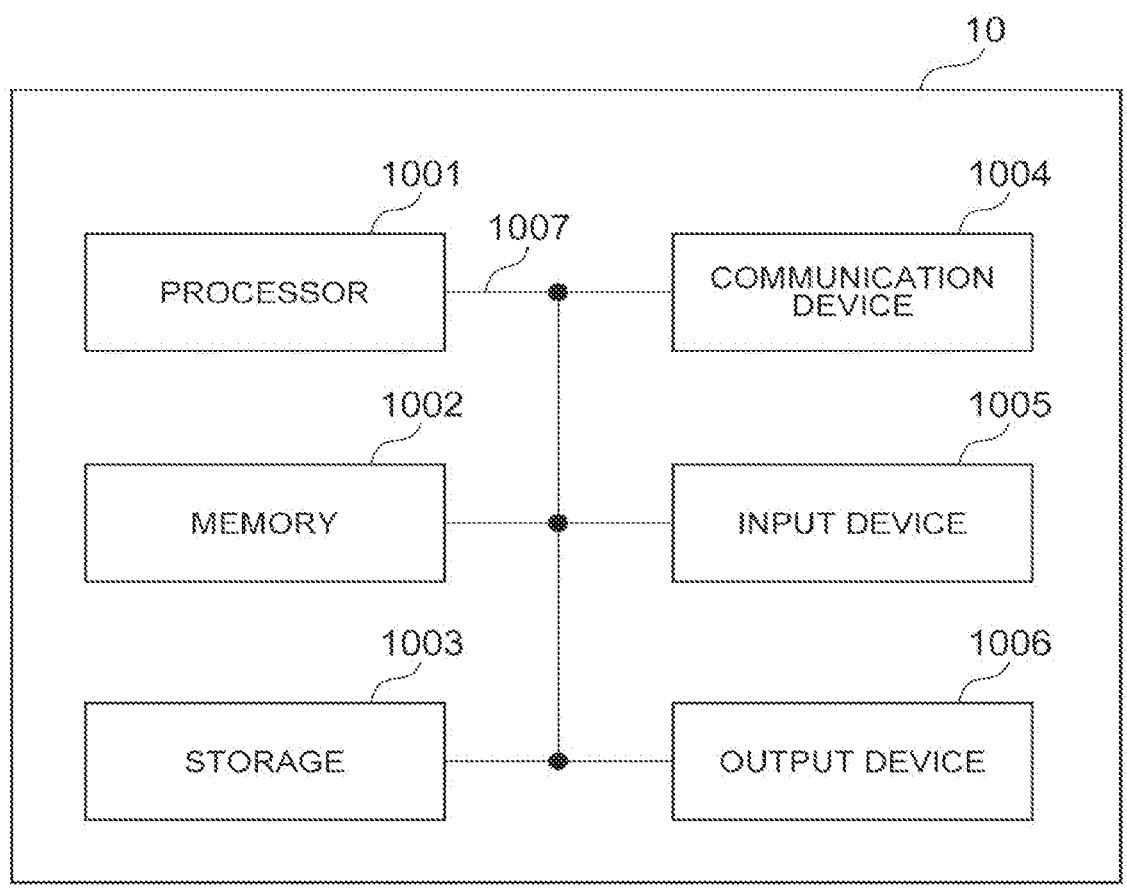
FIG. 8 is a block diagram illustrating an example of a hardware configuration of the server.

For example, the server 10 according to the embodiment may serve as a computer that performs the processes of the server 10 in the above embodiment. FIG. 8 is a diagram illustrating an example of a hardware configuration of the server 10 according to the embodiment. The server 10 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware of the server 10 may be configured to include one or more devices illustrated in FIG. 8 or may be configured to exclude some devices thereof.

The functions of the server 10 can be realized by reading predetermined software (program) to the hardware such as the processor 1001 and the memory 1002 and causing the processor 1001 to execute arithmetic operations and to control communication using the communication device 1004 and reading and/or writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register.

The processor 1001 reads a program (a program code), a software module, data, or the like from the storage 1003 and/or the communication device 1004 to the memory 1002 and performs various processes in accordance therewith. As the program, a program that causes a computer to perform at least some of the operations described in the above-mentioned embodiment is used. For example, the determination unit 14 of the server 10 may be realized by a control program which is stored in the memory 1002 and which operates in the processor 1001, and the other functional blocks illustrated in FIG. 1 may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (a program code), a software module, and the like that can be executed to perform the information processing method according to the above embodiment (for example, the routines illustrated in the flowcharts of FIGS. 6 and 7).

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage mediums may be, for example, a database, a server, or another appropriate medium including the memory 1002 and/or the storage 1003.

The communication device 1004 is hardware (a transmission and reception device) that performs communication between computers via a wired and/or wireless network and is also referred to as, for example, a network device, a network controller, a network card, or a communication module.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The server 10 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted as at least one piece of hardware.

While an embodiment of the invention has been described above in detail, it will be apparent to those skilled in the art that the invention is not limited to the embodiment described in this specification. The invention can be altered and modified in various forms without departing from the gist and scope of the invention defined by description in the appended claims. Accordingly, the description in this specification is for exemplary explanation and does not have any restrictive meaning for the invention.

The order of the processing sequences, the sequences, the flowcharts, and the like of the aspects/embodiments described above in this specification may be changed as long as it does not cause any inconsistencies. For example, in the methods described in this specification, various steps are described as elements in an exemplary order but the methods are not limited to the described order.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof.

Regardless of whether it is called software, firmware, middleware, microcode, hardware description language, or another name, software can be widely analyzed to refer to commands, a command set, codes, code segments, program codes, a program, a sub program, a software module, an application, a software application, a software package, a routine, a sub routine, an object, an executable file, an execution thread, an order, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in this specification and/or the terms required for understanding this specification may be substituted by terms having the same or similar meanings.

Information, parameters, and the like which are described in this specification may be expressed as absolute values, may be expressed as values relative to predetermined values, or may be expressed by other corresponding information.

Names used for the parameters are not restrictive in any respect. Mathematical expressions using the parameters may be different from those which are explicitly described in this specification.

The expression "on the basis of" as used in this specification does not mean "on the basis of only" unless otherwise described. In other words, the expression "on the basis of" means both "on the basis of only" and "on the basis of at least."

When the term "include" or "including" and modifications thereof are used in this specification or the appended claims, the terms are intended to have a comprehensive meaning similar to the term "comprise" or "comprising." The term "or" which is used in this specification or the claims is not intended to mean an exclusive logical sum.

In this specification, two or more of any devices may be included unless the context or technical constraints dictate that only one device is included.

The term "determining" which is used in this specification may include various types of operations. The term "determining" may include cases in which judging, calculating, computing, processing, deriving, investigating, looking up (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" can include cases in which a certain operation is considered to be "determined."

In the entire present disclosure, singular terms include plural referents unless the context or technical constraints dictate that a unit is singular.

REFERENCE SIGNS LIST

1 Positioning system
10 Sever (information processing device)
11 Acquisition unit 12 Extraction unit
13 Setting unit
14 Determination unit
15 Registration unit
16 Generation unit
17 Position determining unit
20 Fixed AP information storage unit (storage unit)
T Mobile terminal

The invention claimed is:

1. An information processing device comprising: an acquisition unit configured to acquire one or more pieces of measurement data including identification information for identifying a radio access point from which radio waves have been received by a mobile terminal, a reception intensity of the radio waves in the mobile terminal, a measurement time corresponding to a time at which the radio waves have been received by the mobile terminal, and position information indicating a position of the mobile terminal corresponding to the measurement time from one or more mobile terminals; an extraction unit configured to extract the measurement data including the identification information of a specific fixed access point (AP) as fixed AP measurement data with reference to a storage unit in which the identification information of one or more fixed APs which are radio access points of which an installation position is fixed and installation position information indicating the installation position are stored; a setting unit configured to extract the measurement data including the measurement time of which a difference from the measurement time included in the fixed AP measurement data is equal to or less than a predetermined threshold value, the position information of which a difference from the installation position of the specific fixed AP is equal to or less than a predetermined threshold value, and the reception intensity of which a difference from the reception intensity included in the fixed AP measurement data is equal to or less than a predetermined threshold value as target measurement data and to set the radio access point corresponding to the identification information included in the target measurement data as a target AP; and a determination unit configured to determine whether the target AP is a radio access point which is fixed at a predetermined installation position on the basis of the measurement data including the identification information corresponding to the target AP and the fixed AP measurement data.

2. The information processing device according to claim 1, wherein the determination unit determines that the target AP is a radio access point which is fixed at a predetermined installation position when an appearance frequency of the target measurement data is equal to or greater than a predetermined threshold value.

3. The information processing device according to claim 1, wherein the determination unit performs:
totaling the number of pieces of the fixed AP measurement data and the number of pieces of the measurement data including the identification information corresponding to the target AP for each of a plurality of predetermined periods;
calculating a degree of similarity between an appearance pattern of the fixed AP measurement data and an appearance pattern of the measurement data including the identification information corresponding to the target AP in the plurality of periods on the basis of the result of totaling; and
determining whether the target AP is a radio access point which is fixed to the predetermined installation position on the basis of the degree of similarity.

4. The information processing device according to claim 1, further comprising a registration unit configured to register the identification information corresponding to the target AP which is determined to be a radio access point fixed to the predetermined installation position by the determination unit as identification information of a new fixed AP in the storage unit.

5. The information processing device according to claim 1, further comprising a generation unit configured to generate a model receiving an input of learning data including the identification information corresponding to one or more radio access points from which radio waves have been received by one mobile terminal and the reception intensity and outputting a staying position of the one mobile terminal,
wherein the generation unit does not use data including the identification information not corresponding to any of the identification information of the fixed AP stored in the storage unit and the identification information corresponding to the target AP which is determined to be a radio access point fixed to the predetermined installation position by the determination unit as the learning data.

6. The information processing device according to claim 5, wherein each radio access point is correlated with predetermined attributes, and
wherein the generation unit preferentially uses data including the identification information corresponding to the radio access point correlated with the attribute for which the number of times of reception of radio waves is large as the learning data with reference to the result of totaling the number of times of reception of radio waves by a mobile terminal for each attribute.

* * * * *